(12) United States Patent
Sitaraman et al.

(10) Patent No.: US 7,493,395 B2
(45) Date of Patent: *Feb. 17, 2009

(54) VIRTUAL PRIVATE DATA NETWORK SESSION COUNT LIMITATION

(75) Inventors: Aravind Sitaraman, Santa Clara, CA (US); Craig Michael Alesso, Lake Elmo, MN (US); Charles Troper Yager, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 10/933,101

(22) Filed: Sep. 1, 2004

(65) Prior Publication Data
US 2005/0044237 A1 Feb. 24, 2005

Related U.S. Application Data

(63) Continuation of application No. 10/085,657, filed on Feb. 27, 2002, now Pat. No. 6,857,019, which is a continuation of application No. 09/306,242, filed on May 6, 1999, now Pat. No. 6,430,619.

(51) Int. Cl.
*G06F 15/173* (2006.01)
(52) U.S. Cl. ............. 709/225; 709/226; 709/227
(58) Field of Classification Search ......... 709/223–229
See application file for complete search history.

(56) References Cited

U.S. PATENT DOCUMENTS

| 5,241,594 | A | | 8/1993 | Kung ........................... 380/4 |
| 5,280,470 | A | | 1/1994 | Buhrke et al. ................ 370/13 |
| 5,442,630 | A | | 8/1995 | Gagliardi et al. ......... 370/85.13 |
| 5,450,483 | A | * | 9/1995 | Williams ............... 379/112.04 |
| 5,623,492 | A | * | 4/1997 | Teraslinna ................. 370/397 |
| 5,640,603 | A | * | 6/1997 | Meritt et al. ................. 710/38 |
| 5,655,077 | A | | 8/1997 | Jones et al. ............ 395/187.01 |

(Continued)

OTHER PUBLICATIONS

Ascend, "Acces Control", Jun. 1997, Product Information, pp. 4.

(Continued)

*Primary Examiner*—Salad Abdullahi
(74) *Attorney, Agent, or Firm*—Thelen LLP; David B. Ritchie

(57) ABSTRACT

A data communications network with a plurality of PoPs maintains a local database associated with each PoP and a central database somewhere on the data communications network. The local database contains a group identification such as a domain identification corresponding to a group of users, a maximum number of VPN sessions to provide the group of users at the PoP and a dynamic VPN session count corresponding to active VPN sessions currently provided to the group of users at the PoP. The central database contains a maximum number of VPN sessions to provide the group of users over the entire data communications network and a dynamic network-wide VPN session count corresponding to active VPN sessions currently provided to the group of users on the entire data communications network. Actions are taken when the group attempts to exceed either the local maximum number of sessions or the network-wide maximum number of sessions by more than a predetermined number. The actions may include assessing extra charges, denying access, and sending warning messages to appropriate recipients.

30 Claims, 5 Drawing Sheets

U.S. PATENT DOCUMENTS

| | | | | |
|---|---|---|---|---|
| 5,671,354 | A | 9/1997 | Ito et al. | 395/187.01 |
| 5,684,950 | A | 11/1997 | Dare et al. | 395/187.01 |
| 5,699,521 | A | 12/1997 | Iizuka et al. | 395/200.15 |
| 5,706,279 | A | 1/1998 | Teraslinna | 370/232 |
| 5,715,394 | A | 2/1998 | Jabs | 395/200.11 |
| 5,745,556 | A | 4/1998 | Ronen | 379/127 |
| 5,778,182 | A | 7/1998 | Cathey et al. | 395/200.49 |
| 5,815,665 | A | 9/1998 | Teper et al. | 395/200.59 |
| 5,835,727 | A | 11/1998 | Wong et al. | 395/200.68 |
| 5,838,671 | A * | 11/1998 | Ishikawa et al. | 370/335 |
| 5,845,070 | A | 12/1998 | Ikudome | 395/187.01 |
| 5,852,812 | A | 12/1998 | Reeder | 705/39 |
| 5,857,102 | A | 1/1999 | McChesney et al. | 395/653 |
| 5,870,605 | A | 2/1999 | Bracho et al. | 395/682 |
| 5,875,387 | A | 2/1999 | Ayerst | 455/31.3 |
| 5,898,780 | A | 4/1999 | Liu et al. | 380/25 |
| 5,905,736 | A | 5/1999 | Ronen et al. | 370/546 |
| 5,913,061 | A | 6/1999 | Gupta et al. | 395/680 |
| 5,944,824 | A | 8/1999 | He | 713/201 |
| 5,946,299 | A | 8/1999 | Blonder | 370/237 |
| 5,953,338 | A * | 9/1999 | Ma et al. | 370/392.1 |
| 5,966,372 | A | 10/1999 | Wright et al. | 370/329 |
| 5,970,477 | A | 10/1999 | Roden | 705/32 |
| 5,982,748 | A | 11/1999 | Yin et al. | |
| 5,991,810 | A | 11/1999 | Shapiro et al. | 709/229 |
| 5,991,828 | A | 11/1999 | Horie et al. | 710/8 |
| 5,999,514 | A | 12/1999 | Kato | 370/231 |
| 6,011,910 | A | 1/2000 | Chau et al. | 395/200.59 |
| 6,018,619 | A | 1/2000 | Allard et al. | 395/200.54 |
| 6,026,440 | A | 2/2000 | Shrader et al. | 709/224 |
| 6,047,376 | A | 4/2000 | Hosoe | 713/201 |
| 6,055,564 | A | 4/2000 | Phaal | 709/207 |
| 6,070,192 | A | 5/2000 | Holt et al. | 709/227 |
| 6,092,196 | A | 7/2000 | Reiche | 713/201 |
| 6,115,613 | A | 9/2000 | Johsson | 455/519 |
| 6,119,160 | A | 9/2000 | Zhang et al. | 709/224 |
| 6,141,687 | A | 10/2000 | Blair | 709/225 |
| 6,219,790 | B1 | 4/2001 | Lloyd et al. | 713/201 |
| 6,226,277 | B1 * | 5/2001 | Chuah | 370/328 |
| 6,243,449 | B1 * | 6/2001 | Margulis et al. | 379/112.04 |
| 6,263,369 | B1 | 7/2001 | Sitaraman et al. | 709/225 |
| 6,304,549 | B1 | 10/2001 | Srinivasan et al. | |
| 6,330,313 | B1 * | 12/2001 | Hunt | 379/133 |
| 6,360,270 | B1 * | 3/2002 | Cherkasova et al. | 709/229 |
| 6,377,548 | B1 | 4/2002 | Chuah | |
| 6,377,571 | B1 | 4/2002 | Tai | |
| 6,377,955 | B1 * | 4/2002 | Hartmann et al. | 707/104 |
| 6,408,336 | B1 | 6/2002 | Schneider et al. | |
| 6,412,007 | B1 * | 6/2002 | Bui et al. | 709/227 |
| 6,430,619 | B1 * | 8/2002 | Sitaraman et al. | 709/225 |
| 6,434,141 | B1 | 8/2002 | Oz et al. | |
| 6,438,597 | B1 * | 8/2002 | Mosberger et al. | 709/227 |
| 6,453,419 | B1 | 9/2002 | Flint et al. | |
| 6,529,955 | B1 | 3/2003 | Sitaraman et al. | 709/225 |
| 6,628,612 | B1 | 9/2003 | Sabry et al. | |
| 6,636,503 | B1 | 10/2003 | Shiran et al. | |
| 6,636,898 | B1 | 10/2003 | Ludovici et al. | |

OTHER PUBLICATIONS

D. Carrel et al., "The TACACS+ Protocol" ver. 1.78, Network Working Group Internet Draft, Jan. 1997, pp. 1-40, http://www.tacplus.org/downloads/tac-rfc.1.78.txt.

Cisco, "User Control Point", Sep. 10, 1998, http://www.cisco.com/warp/public/728/ucp/ucp_ds.htm.

Edell et al., "Billing Users and Pricing for TCP", IEEE Journal, 1995, pp. 1-14.

U.S. Appl. No. 09/306,691, Office Action dated Dec. 28, 2001.
U.S. Appl. No. 09/306,691, Office Action dated May 8, 2002.
U.S. Appl. No. 09/306,691, Notice of Allowance dated Oct. 1, 2002.
U.S. Appl. No. 09/306,242, Office Action dated Mar. 22, 2001.
U.S. Appl. No. 09/306,242, Office Action dated Sep. 17, 2001.
U.S. Appl. No. 09/306,242, Notice of Allowance dated Feb. 26, 2002.
U.S. Appl. No. 09/355,666, Office Action dated Jul. 15, 2003.
Office Action dated Dec. 4, 2003, U.S. Appl. No. 10/177,395.

* cited by examiner

CENTRAL DATABASE

| DOMAIN | NETWORK MAX SESSIONS | NETWORK ABS MAX SESSIONS | NETWORK WIDE SESSION COUNT |
|---|---|---|---|
| $CORP_A$ | 50 | 100 | 45 |
| $CORP_B$ | 75 | 150 | 85 |
|  |  |  |  |
|  |  |  |  |

FIG. 3

LOCAL DATABASE

| DOMAIN | LOCAL MAX SESSIONS | LOCAL ABS MAX SESSIONS | LOCAL SESSION COUNT |
|---|---|---|---|
| $CORP_A$ | 15 | 25 | 17 |
| $CORP_B$ | 25 | 35 | 26 |
|  |  |  |  |
|  |  |  |  |

VIRTUAL PRIVATE DATA NETWORK SESSION COUNT LIMITATION

CROSS-REFERENCES

This is a continuation of U.S. patent application Ser. No. 10/085,657, filed Feb. 27, 2002 now U.S. Pat. No. 6,857,019, in the name of inventors Aravind Sitaraman, Charles Yager, and Craig Alesso, entitled "Virtual Private Data Network Session Count Limitation", commonly assigned herewith, which is a continuation of U.S. patent application Ser. No. 09/306,242, filed May 6, 1999, in the name of inventors Aravind Sitaraman, Charles Yager, and Craig Alesso, entitled "Virtual Private Data Network Session Count Limitation", now U.S. Pat. No. 6,430,619, commonly assigned herewith and hereby incorporated herein by reference as if set forth fully herein.

BACKGROUND OF THE INVENTION

1. Field of the Invention

The present invention relates to the field of data communications networks. More particularly, this invention relates to a method and apparatus for limiting the number of virtual private data network (VPN or VPDN) sessions provided to a group of users locally and network-wide in a data communications network.

2. The Background

ISPs (Internet Service Providers) and Telcos (telephone companies) (collectively referred to as "Wholesale Providers" or "Wholesalers") typically offer various forms of retail Internet access to their subscribers. In a typical retail model as shown in FIG. 1, a user will contact a network access server (NAS) either using dial-up telephone lines, digital subscriber lines, ISDN (integrated services digital network) lines, or the like. The NAS interfaces the user with the data communications network. The way this works is that a user, for example, Joe@corpa.com, dials in to a NAS at ISP's Point of Presence (PoP$_1$) on the Internet. A PPP (point to point protocol) session 12 is raised between NAS$_1$ 14, and Joe's terminal 16. An LCP (Link Control Protocol) session is raised between NAS$_1$ and Joe's terminal. At this time the NAS$_1$ generates an AAA authentication request using a protocol such as RADIUS (Remote Authentication Dial-In User Service) to the ISPs AAA (authentication, authorization and accounting) service 20. The AAA service 20 handle Joe's authentication (receipt and verification of password and user name), provisions him with appropriate authorizations, and handles accounting for the time and services used by Joe on the data communications network. The AAA service uses a local database 22 to store and retrieve AAA information. To complete Joe's log-in, an access-accept packet is sent to NAS$_1$ from AAA service 20. Then an IPCP (Internet Protocol Control Protocol) session is raised between NAS$_1$ and Joe's terminal during which an IP address is returned to configure Joe's terminal's PPP stack. This completes the log-in of Joe.

Wholesale Providers also offer wholesale Internet access to subsidiary and specialized service providers, CLECs (Competitive Local Exchange Carriers), corporations, and Community of Interest (COI) providers. Naturally, the processing afforded customers of the wholesale variety differs from the processing afforded customers of the retail variety. Subscriber information for individual wholesale users is usually stored by those who lease data communications network access from the ISP or Telco. Hence, corporations, CLECs and COI providers do not normally share their user information with the wholesale providers. The Wholesaler, however, typically also has its own retail subscribers whose user information is stored in its databases. In some cases, a particular user might have accounts with both a retail and a wholesale provider. Hence, the Wholesaler must distinguish between the user's wholesale and retail accounts and initiate different actions based upon their status or Service Level Agreements (SLAs).

Traditional wholesale ISPs and Roaming Service Providers offer network access through a technique called "authentication proxying." Proxying involves the transfer of the authentication responsibility to the "owner" of the subscriber. Thus, if a corporation was to outsource its corporate intranet to a Wholesaler, it would give up the maintenance of its dial-up servers (i.e., the NASes). It would not, however, normally want to give up the control of or information regarding its employees. Hence, when a corporate user connects to such a Wholesaler's network access servers, the user essentially perceives that the user is dialing into a corporate facility when the user is actually dialing into the Wholesaler's domain and then somehow gaining admittance to the corporation's intranet.

What really happens in that scenario is that the Wholesaler determines that the user belongs to Corporation A (Corp$_A$) by parsing either the fully qualified domain name ("FQDN") (e.g., Joe@corpa.com) supplied by the user, reading the DNIS ID associated with the call, reading the CLID associated with the call, or by using some other known mechanism. Using a DNIS ID, the Wholesaler looks at the telephone number (or a specific NAS in access networks other than dial-up) through which the user is connecting to the network. So if a user calls in to 123-456-7890 from his number of 123-444-5555, then the Wholesaler can know which number was called, i.e., the completing station. Having determined that the user trying to gain access belongs to Corp$_A$, the Wholesaler cannot authenticate the user by itself. As noted earlier, the user's record is still located on Corp$_A$'s equipment. Hence, the Wholesaler will "proxy" out the authentication transaction from its AAA proxy service to Corp$_A$. An AAA service within the corporation domain then identifies the user, verifies the password, and provisions the user with appropriate authorizations. It may also receive accounting information, if desired. Then the AAA service at Corp$_A$ notifies the Wholesaler's proxy service that the user is acceptable and passes along provisioning details associated with the user (such as an IP (Internet protocol) address to use or a pool identification of an IP address pool from which an IP address needs to be allocated and any other information that may be needed). The Wholesaler then grants the user access to the network based upon the reply it gets back from Corp$_A$. This technique is called "proxying." This is shown diagrammatically in FIG. 2.

To be able to perform basic proxying, the Wholesaler maintains minimal information on its proxy service 24 at its PoP. Information such as supported domain names, the IP address to which the transaction is to be sent, the port number (typically an OSI Layer 4 port number) to which the transaction is to be addressed, a shared secret between the proxy service and the remote AAA service, etc., are typically stored on proxy service 24's local configuration database 30.

For example, user Joe@corpa.com dials in to NAS$_1$. A PPP (point to point protocol) session 26 is typically raised between Joe's terminal and NAS$_1$ as is a LCP (Link Control Protocol) session. At this time the NAS$_1$ generates an authentication request using a protocol such as RADIUS (Remote Authentication Dial-In User Service) to proxy service 24. Proxy service 24 then consults its local configuration database 30. Proxy service 24 then makes a determination about where to send the access-request packet. Here it decides to send it to the AAA service 32 maintained in the Corp$_A$ domain 34. The Corp$_A$ AAA 32 then consults its local database 36 and authenticates Joe@corpa.com. Corp$_A$ AAA 32 then returns an access-accept packet to proxy service 24 which, in turn, sends an access-accept packet to NAS$_1$. Then an IPCP (Internet Protocol Control Protocol) session is raised between NAS$_1$ and Joe's terminal during which an IP address is returned to configure Joe's terminal's PPP stack thus completing the log-in of Joe@Corpa.com.

Frequently a large corporation or similar entity will have a need to provide PoPs at a number of locations to service its clients, customers and/or employees in a number of different cities. For example, a corporation "Corp$_A$" located in Los Angeles, Calif. might have some employees using dial-up lines from San Francisco, Calif. and New York City, N.Y. Particularly in this situation, and in other situations, it is frequently desirable to establish a secure virtual private network (VPN) session which uses a tunneling protocol such as L2TP (layer two tunneling protocol) to effectively direct the communications from one node on the Internet to another node on the Internet. Communications using these techniques are particularly secure because the entire packet is encapsulated by the protocol and within the encapsulation the data is encrypted. A particularly good way to establish the VPN session is between the NAS that the user is connected to and a gateway device at the location with which the user is to communicate. This might be, for example, a corporate intranet.

The overhead of a VPN session exceeds that of a normal session of a retail user logged in to a NAS because the NAS must handle the encryption duties and the additional overhead of the larger encapsulated packets. As a result, it would be desirable to provide a mechanism for accounting for such sessions, charging for them and limiting their use to a quantity contracted for. Doing so is, however, not particularly easy given the current limited accounting capabilities on the Internet.

For example, if Corp$_A$ has a great number of employees in San Francisco, they could overwhelm the PoP with VPN sessions back to the home office and possibly prevent regular retail or other wholesale customers of the Wholesaler from enjoying the quality and level of service that they have paid for. Similarly, a large number of employees using uncontrolled VPN sessions spread over many regions could potentially overwhelm the network maintained by the Wholesaler. Accordingly, the Wholesaler would like to enter into an arrangement with Corp$_A$ whereby Corp$_A$ pays a fee for a more or less specific maximum number of VPN sessions to occur at any one time. When Corp$_A$ exceeds this contracted number it is either cut off or charged an extra fee. In this way, the Wholesaler is able to plan for its expansion and receive realistic information on the number of these sessions that it must be able to support.

SUMMARY OF THE INVENTION

A data communications network with a plurality of PoPs maintains a local database associated with each PoP and a central database somewhere on the data communications network. The local database contains a group identification such as a domain identification corresponding to a group of users, a maximum number of VPN sessions to provide the group of users at the PoP and a dynamic VPN session count corresponding to active VPN sessions currently provided to the group of users at the PoP. The central database contains a maximum number of VPN sessions to provide the group of users over the entire data communications network and a dynamic network-wide VPN session count corresponding to active VPN sessions currently provided to the group of users on the entire data communications network. Actions are taken when the group attempts to exceed either the local maximum number of sessions or the network-wide maximum number of sessions by more than a predetermined number. The actions may include assessing extra charges, denying access, and sending warning messages to appropriate recipients.

BRIEF DESCRIPTION OF THE DRAWINGS

FIG. 3 is a diagram illustrating the information stored in a central database in accordance with a presently preferred embodiment of the present invention.

FIG. 4 is a diagram illustrating the information stored in a local database in accordance with a presently preferred embodiment of the present invention.

DETAILED DESCRIPTION OF THE PREFERRED EMBODIMENTS

Figure 1:
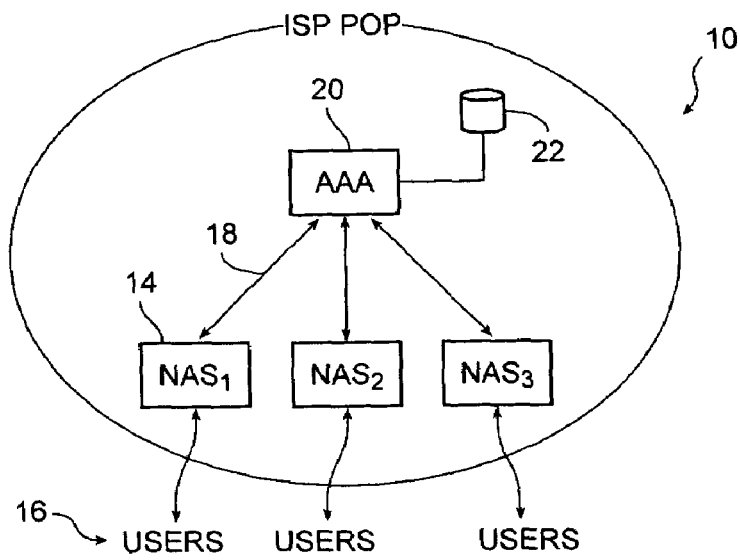
FIG. 1 is a system block diagram of a simple ISP PoP using a conventional retail-only paradigm.
Figure 2:
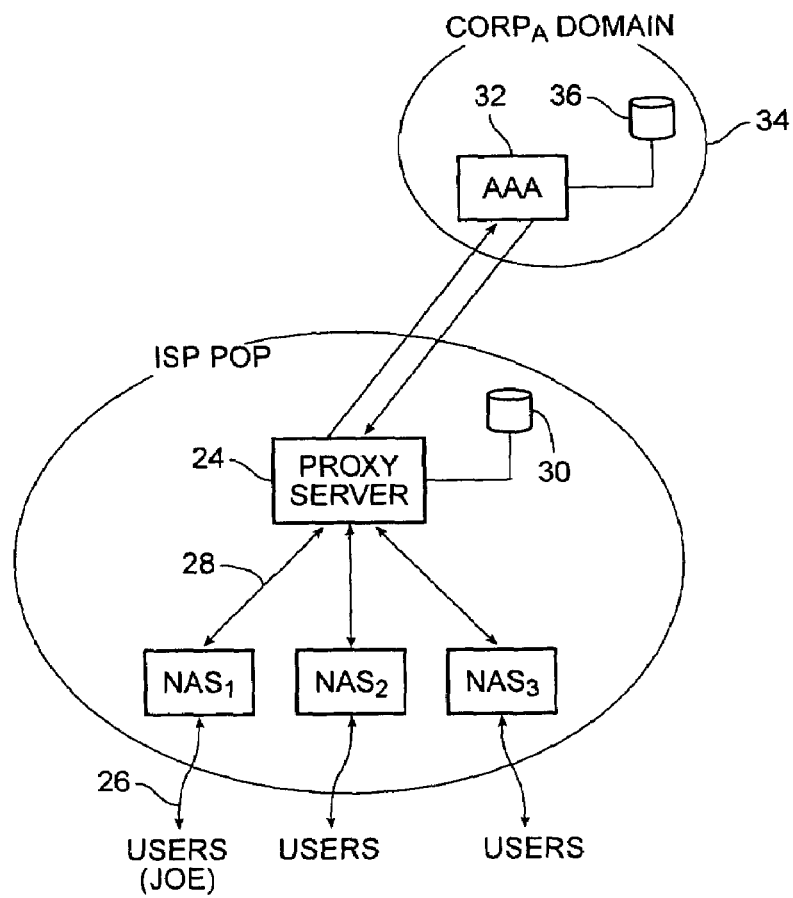
FIG. 2 is a system block diagram of wholesale ISP PoP using a conventional wholesale-only paradigm.

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, processes and/or data structures may be implemented using C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

In accordance with one embodiment of the present invention the AAA proxy service may be implemented within a protocol gateway (PGW). PGWs are devices which couple users via a network access server (NAS) to the data communications network by dynamically converting protocols. The term gateway is not meant to be limited to a single type of device, as any device, hardware or software, that may act as a bridge between the user and the network may be considered a gateway for the purposes of this application. In accordance with one presently preferred embodiment of the present invention, the PGW may be a software service operating on a general purpose computer running the User Control Point (UCP) software package available from Cisco Systems, Inc. of San Jose, Calif.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with a presently preferred embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the data communications network and still be within the inventive concepts disclosed herein.

In accordance with the present invention wholesale users such as $Corp_A$ and $Corp_B$ will subscribe with a Wholesaler for a certain level of VPN coverage both at particular PoPs on the network and network-wide. For example, the wholesale user could subscribe to a maximum number of VPN sessions of 50 network wide and 15 at a particular PoP. If the maximum is exceeded either at the PoP or network-wide then the next attempted log in can be handled in a number of different ways. First, it can simply be refused. Second, it can be accepted up to an "absolute maximum" of, say, 100 network-wide and 25 at the PbP. This absolute maximum provides some warning room before denying service to a user. Optionally, wholesale customers can be warned when they are exceeding the maximum without suffering a denial of service. They may also be charged an extra fee for the extra service, if desired. The extra fee would be charged by initiating a special RADIUS accounting packet in response to the log in over the maximum and sending it to the proper AAA service. Ideally the wholesale customer would adjust its service contract to the level of use it is actually making of the network and the PoPs.

To implement the invention, it is necessary to keep track of data not previously tracked in a data communications network. Central database 38 shown in FIG. 3 maintains a list identifying domains (or otherwise identifying customer "groups") that have subscribed to wholesale VPN access. Each domain or other group identification has associated therewith a value for "network maximum sessions" which indicates the number of VPN sessions that the group is ordinarily entitled to on a network-wide basis. In the example of FIG. 3, $Corp_A$ is entitled to 50 and $Corp_B$ is entitled to 75. Normally this means that if a user from $Corp_A$ dials into a PoP, the Wholesaler is required to service the user as long as the user's log in won't exceed the maximum network-wide or at the PoP. The Wholesaler may provide this access in a conventional manner.

Note that the "group" may be based on network domain name such as "Corpa.com", or on some other determinable characteristic. Since the DNIS ID and/or the CLID may be used, it is possible to group users by the telephone numbers that they call from or dial into. Hence a group may have any number of diverse users in it. The term "group" will be used herein for simplicity, but it is meant in this broader sense to be inclusive of any such determinable group of users.

Optionally, a "Network Absolute Maximum Sessions" value may be kept to indicate how many sessions the group may actually get before denial of service. In the example of FIG. 3 $Corp_A$ is entitled to 100 and $Corp_B$ is entitled to 150. As pointed out above, there may be an extra charge levied for exceeding the network maximum sessions value.

The Central Database 38 also keeps a count of the current VPN sessions in effect network wide. This count is maintained by the broker-publisher system described in more detail below.

A Wholesaler may wish to take action in a conservative manner, as by adding a fixed number of "grace" sessions to avoid penalizing a client before the client has clearly exceeded the terms of its service contract by more than a reasonable level. On the other hand, the "grace" number may also be set to zero.

The Central Database 38 may also contain additional information as desired including a mirror of same or all of the data contained in the local databases 40 if desired.

Local Databases 40 as shown in FIG. 4 are associated with each PoP. They may be stored in local cache memory at each PoP or in any other convenient fashion. There is no requirement that they be stored at the PoP, it just may be convenient to do so.

Local Database 40 operates much like Central Database 38. Local Database 40 relates to a single PoP and contains a list of domain or customer identifications coupled with a local maximum sessions value, local absolute maximum sessions value and a local session count value indicative of the actual current number of VPN sessions belonging to the group and occurring at the particular PoP.

As before, attempts to log in more than the permitted number of local VPN sessions can be handled in a number of different ways. Local VPN session log ins increment the appropriate domain's local session count and log outs decrement the count.

Figure 5:
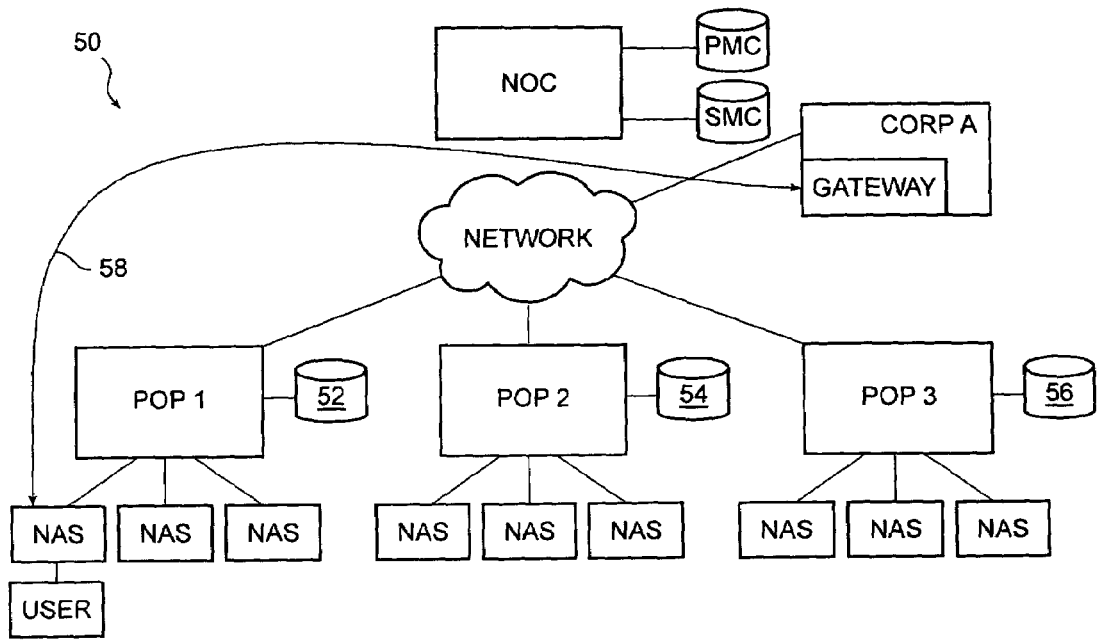
FIG. 5 is a system block diagram of a data communications network in accordance with a presently preferred embodiment of the present invention.

FIG. 5 is a simplified block diagram of a data communications network 50 in accordance with a presently preferred embodiment of the present invention. The Network includes $PoP_1$, $PoP_2$ and $PoP_3$. Each of $PoP_1$, $PoP_2$ and $PoP_3$ has an associated local database 52, 54, 56 as shown. A network operations center (NOC) includes a primary mother cache (PMC) and a redundant secondary mother cache (SMC) as known to those of ordinary skill in the art. The PMC and SMC are preferably used to store the Central Database 38. A VPN session 58 has been raised between a NAS at $PoP_1$ and a gateway device at $Corp_A$ as shown. While the VPN session 58 is routed in a conventional way, the VPN encapsulation and encryption of the packets isolates it from any likely interception, hence it is shown as a separate, isolated link.

Figure 6:
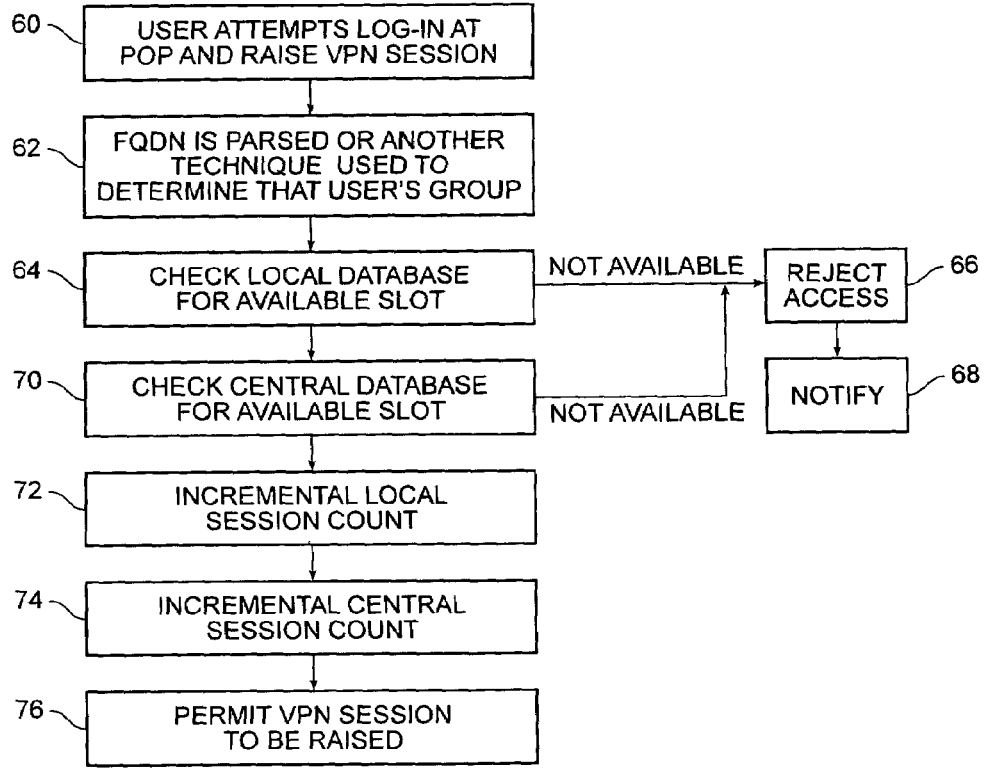
FIG. 6 is a flow diagram of a process for verifying slot availability for a VPN user on a data communications network in accordance with a presently preferred embodiment of the present invention.

FIG. 6 is a flow diagram illustrating the log in process for a VPN user in accordance with a presently preferred embodiment of the present invention. At block 60 the user attempts the log in at a local PoP and raise a VPN session. At block 62 the group of the user is determined. This may be done in one of several ways as discussed above, but most commonly involves parsing the FQDN of the user to determine his domain. At block 64 the local database 40 is searched for the group entry corresponding to the user. If VPN session slots are available (i.e., absolute maximum sessions is not exceeded if this session is to be allowed) then control transfers to block 70. Otherwise, the VPN session is rejected at block 66 and optionally the group administrator and/or user is notified in a conventional manner as set forth in the process at block 68.

Optionally, some sort of "grace" level may be applied at block 64 so that rejection of the VPN session does not occur precisely at the level specified in the service agreement with the domain.

At block 70 the central database 38 is queried to see if VPN slots are available. If they are, control transfers to block 72, otherwise the VPN session attempt may be rejected. "Grace" slots may also be considered for application here.

At block 72, the session count in the local database 40 is incremented. At block 74 the session count in the central database 38 is incremented. At block 76 the user is permitted to raise the VPN session 58 to access the desired domain. The user must still be authenticated and authorized, presumably by an AAA service at $Corp_A$.

Figure 7:
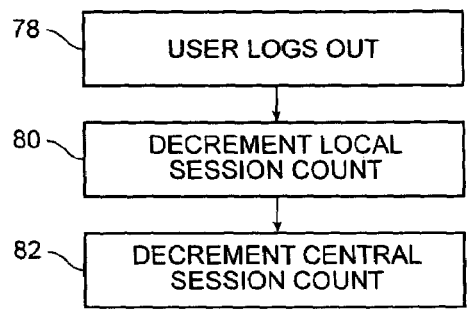
FIG. 7 is a flow diagram of a process for updating slot availability information in a data communications network in accordance with a presently preferred embodiment of the present invention.

When a user drops the VPN session, e.g., at log out, it is important to decrement the session counts so that an accurate session count is always kept locally as well as centrally. FIG. 7 shows how this is done. At block 78 the user initiates the log out process. At block 80 the local session count in local database 40 is decremented. At block 82 the central session count in central database 38 is decremented.

Figure 8:
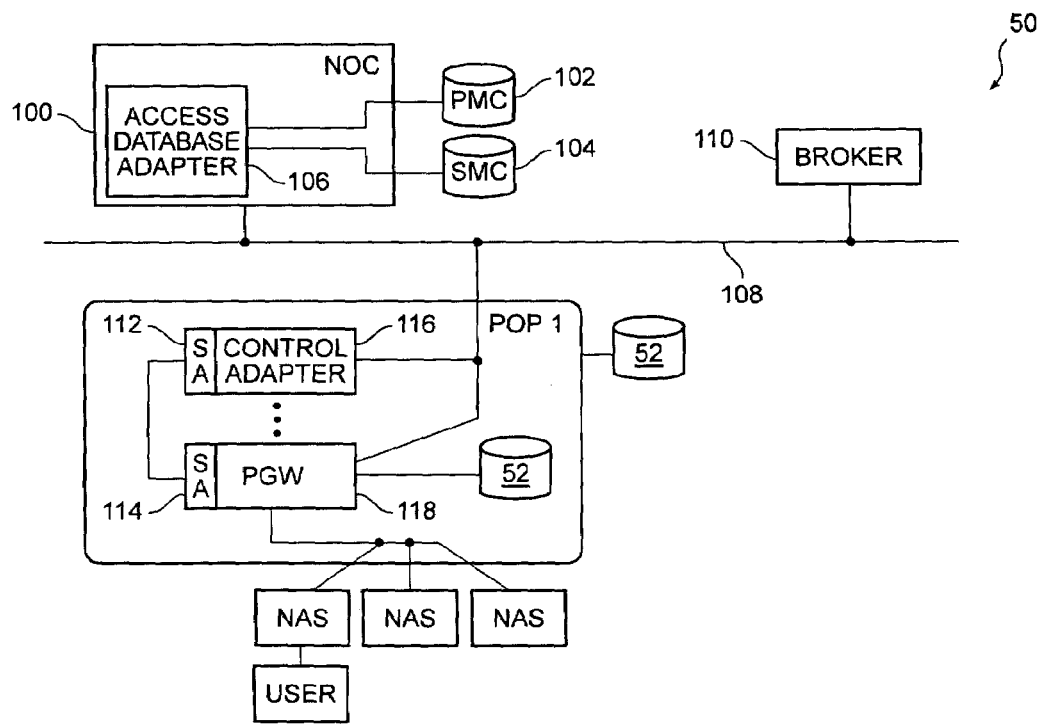
FIG. 8 is a system diagram of a data communications network in accordance with a presently preferred embodiment of the present invention.

FIG. 8 is a system block diagram of a portion of data communication network 50 in accordance with a presently preferred embodiment of the present invention. Network Operations Control Center (NOC) 100 is located centrally on the network 50. There may be more than one NOC on a particular data communications network. Typically each Wholesaler will have at least one NOC. The Primary Mother Cache (PMC 102) and Secondary Mother Cache (SMC 104) are memory storage components associated with NOC 100. An access database adapter 106 is in communication with PMC 102 and SMC 104 as well as an information bus 108. This adapter, and other adapters in the invention, provide bi-directional mapping of information between components and other services comprising the data communications network 50. Adapters, such as the access database adapter 106 subscribe to and publish events. An event is an independent entity that contains an unspecified amount of non-time critical information. For example, the access database adapter 106 receives commands to publish an event. The information contained in the event may be found in the request or the access database adapter 106 may communicate with the PMC 102 to find the required information. The event is then published to other services and components within the data communications network across an information bus 108 which may be the data communications network itself. Of course this is only one way to achieve data synchronization—one can easily implement a centralized model or a fully meshed communication model to achieve the same end.

The information bus 108 that serves as the transportation medium for the presently preferred embodiment of the present invention can be Common Object Request Broker Architecture (CORBA)-based. The CORBA-based information bus is capable of handling the communication of events to and from objects in a distributed, multi-platform environment. The concept of a CORBA-based information bus is well known by those of ordinary skill in the art. Other acceptable communication languages can be used as are also known by those of ordinary skill in the art. Other transportation models are available as well, such as the Distributed Component Object Model (DCOM), which will readily achieve the same end.

CORBA provides a standard way of executing program modules in a distributed environment. A broker 110, therefore, may be incorporated into an Object Request Broker (ORB) within a CORBA compliant network. To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

Figure 9:
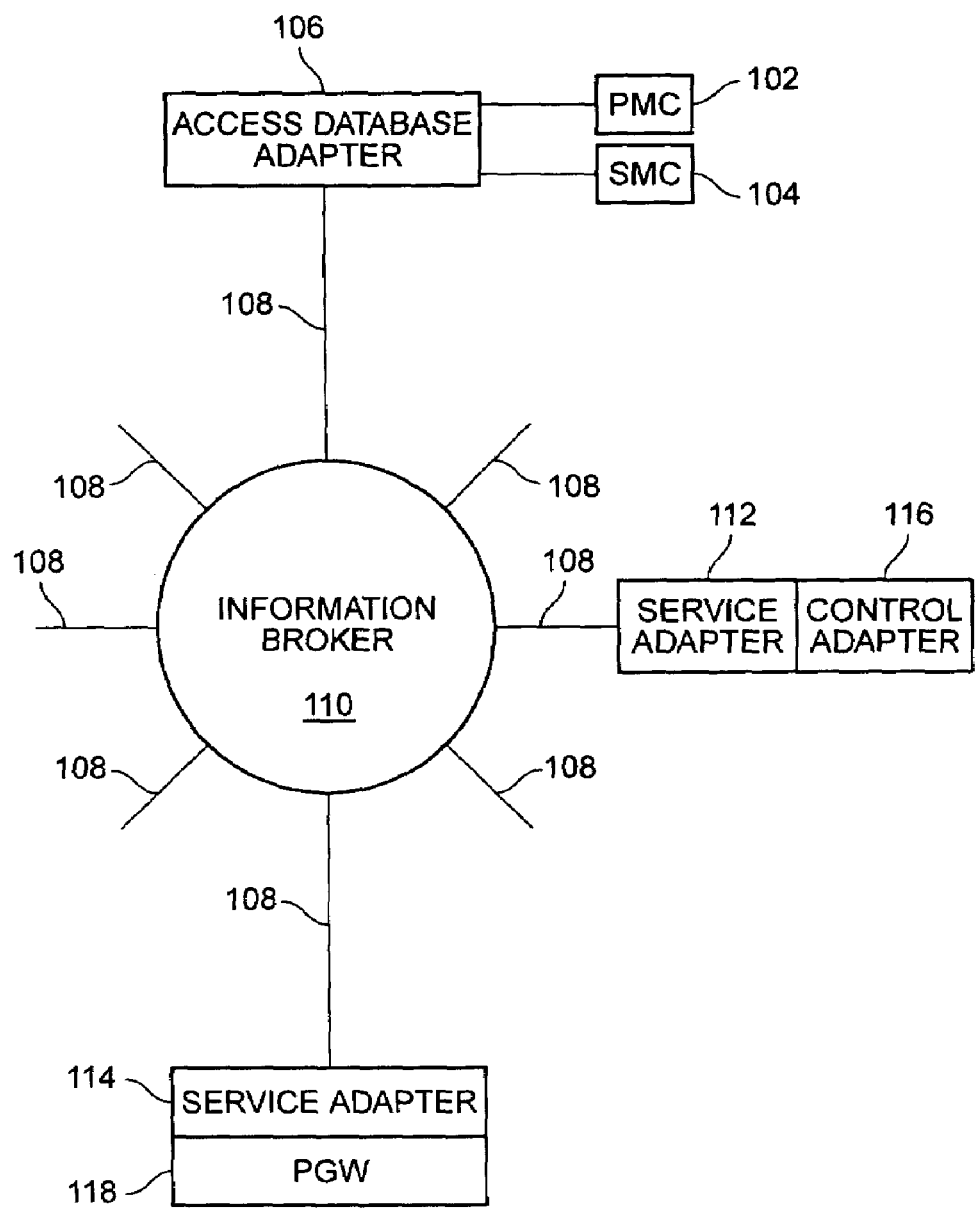
FIG. 9 is a block diagram of a broker-publisher system used in a presently preferred embodiment of the present invention.

In accordance with a presently preferred embodiment of the present invention an Enterprise Application Integration (EAI) system is used to broker the flow of information between the various services and adapters comprising the data network management system of the present invention. An example of an EAI system that can be incorporated in the presently preferred invention is the ActiveWorks Integration System, available from Active Software of Santa Clara, Calif. As shown in FIG. 9, such an EAI system 112 uses an information broker 110 as the hub of the system. The information broker 110 acts as the central control and storage point for the system. The information broker 110 can reside on a server and serves to mediate requests to and from networked clients; automatically queuing, filtering and routing events while guaranteeing delivery. The information broker 110 is capable of storing subscription information and using such subscription information to determine where published information is to be sent. Referring back to FIG. 8, the information broker 110 is shown as being located at a point along the information bus 108. In most instances, the broker will be located within the same NOC 100 as the host that runs the access database adapter 106 application. Another key feature to the EAI system 112 of FIG. 9 is the use of service adapters 112 and 114 that allow users of the EAI system 112 to integrate diverse applications and other information when using the integration system. Service adapters 112 and 114 provide bi-directional mapping of information between an application's native format and integration system events, enabling all custom and packaged applications, databases, and Internet and other network applications to exchange information. As shown in FIG. 9 the adapters 112 and 114 run in association with the various services 116 and 118 from which information is published and subscribed on to an information bus 108 that has its hub at the broker 110.

Referring back to FIG. 8 the information bus 108 is in communication with a Point of Presence (POP) ($POP_1$) within the data communications network 50. $POP_1$ is one of many PoPs with which the information bus 108 is in communication. Located within $PoP_1$ is a host or node which may comprise one or more computing devices on which some or all of the services shown in FIG. 8 may be running. The node is in communication with the information bus 108 through a control adapter 116 which provides control communications with the various services such a PGW 118 through their respective service adapters 114, via service adapter 112 of control adapter 116. Those of ordinary skill in the art will appreciate that the services shown are not intended to be limiting and that other services and other service configurations can be used without departing from the inventive concepts herein disclosed. The system services may also be distributed over two or more servers to provide improved performance and redundancy.

The protocol gateway service 118 is used to couple the network user to the data communication network. The protocol gateway service 118 functions as an interface to the NASes that allows access requests received from a user to be serviced using components that may communicate using different protocols. A typical protocol gateway service 118 may be able to support different user access methodologies, such as dial-up, frame relay, leased lines, cable, DSL (Digital Subscriber Line), and the like.

Thus, in one embodiment of the invention, the broker-publisher system described above is used to publish VPN start events from the PGW 118 or other access port of the data communications network 50 to the central database at the PMC 102 (and SMC 104). Similarly, the local databases may subscribe to receive the central database information so that the decision to accept or reject may be made locally at the PoP, or they may simply query the PMC 102 to determine if an incremental user may raise a VPN. In an alternative embodiment, the central database may be omitted and each local database will then subscribe to each other local PoP's VPN start events and VPN stop events so as to locally maintain a current network-wide VPN session count as well as a local VPN session count.

Alternative Embodiments

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for limiting the number of VPN sessions raised by users belonging to a particular group in a data communications network to a predetermined number, said method comprising:
    maintaining a central database including group identifications, corresponding maximum numbers VPN sessions for each group, and corresonding network-wide VPN session counts for each group;
    responding to a user's attempt to initiate a VPN session on the data communications network as a member of a particular group by checking the central database to determine if the user's VPN session would exceed by a predetermined number said corresponding maximum number of VPN sessions associated with said particular group.

2. A local database checker associated with a particular PoP of a data communications network, the local database checker comprising:
    a network inter-face for interfacing with the data communications network; and
    at least one computing device coupled to the network interface and configured to, in response to a user's attempt to initiate a VPN session on the data communications network as a member of a particular group, check a local database associated with the PoP to determine if the user's VPN session would exceed by a predetermined number the corresponding maximum number of VPN sessions associated with the particular group at the PoP, the local database being part of a set of distributed databases and including group identifications, corresponding maximum numbers of VPN sessions for each group at the PoP, and corresponding current VPN session counts for each group at the PoP.

3. The local database checker according to claim 2 wherein the local database checker is operatively coupled to a VPN session rejecter configured to reject the user's attempt to initiate a VPN session if the user's log in would exceed by a first predetermined number the corresponding maximum number of VPN session associated with the particular group at the PoP.

4. The local database checker according to claim 3 wherein the local database checker is operatively coupled to:
    a session allower configured to allow the user's attempt to initiate a VPN session if it is not rejected; and
    a VPN session count incrementer associated with the local database and the user's group and responsive to allowing the user's VPN session.

5. The local database checker according to claim 4 wherein the local database checker is operatively coupled to:
    a VPN start event publisher configured to publish VPN start events corresponding to a user's group to other subscribing PoPs in response to allowing the user's VPN session; and
    a data communication network current VPN session count incrementer associated with the local database and the user's group and responsive to allowing the user's VPN session.

6. A VPN session limiter associated with a particular PoP of a data communications network, the VPN session limiter comprising:
    a network interface for interfacing with the data communications network; and
    at least one computing device coupled to the network interface and configured to, in response to a user's attempt to initiate a VPN session on the data communications network as a member of a particular group:
        check a local database to determine if the user's VPN session would exceed by a first predetermined number the corresponding maximum number of VPN sessions associated with the particular group at the PoP; and
        check the local database to determine if the user's VPN session would exceed by a second predetermined number the corresponding maximum number of VPN sessions associated with the particular group on the data communications network, the local database being part of a set of distributed databases and including group identifications, corresponding maximum numbers of VPN sessions for each group at the PoP, and corresponding current VPN session counts for each group at the PoP.

7. The VPN session limiter according to claim 6 wherein the VPN session limiter is further configured to reject the user's attempt to initiate a VPN session if the user's VPN session would exceed by a first predetermined number the corresponding maximum number of VPN sessions associated with the particular group at the PoP or would exceed by a second predetermined number the corresponding maximum number of VPN sessions associated with the particular group on the data communications network.

8. A VPN session limiter according to claim 7 wherein the VPN session limiter is further configured to:
    allow the user's VPN session if it is not rejected;
    increment a VPN session count associated the user's group at the local database in response to allowing the user's VPN session;
    publish a VPN start event corresponding to the user's group to other subscribing PoPs in response to allowing the user's VPN session; and increment a data communications network current VPN session count at each subscribing PoP in response to the publishing of the VPN start event.

9. The VPN session limiter of claim 8 wherein the VPN session limiter is further configured to:
- decrement a VPN session count associated with the user's group at the local database in response to a user's VPN session termination;
- publish a VPN stop event corresponding to the user's group to other subscribing PoPs in response to a user's VPN session; and
- decrement a data communications network current VPN session count at each subscribing PoP in response to the publishing of the VPN stop event.

10. A network node associated with a particular PoP of a data communications network, the network node comprising:
- a VPN start event publisher configured to publish VPN start events corresponding to a user's group to other subscribing PoPs in response to allowing the user's VPN session; and
- a data communications network current VPN session count incrementer associated with a local database and the user's group and responsive to the user's VPN session being allowed, the local database being part of a set of distributed databases and including group identifications, corresponding maximum numbers of VPN sessions for each group at the PoP, and corresponding current VPN session counts for each group at the PoP.

11. A network node associated with a particular PoP of a data communications network, the network node comprising:
- a VPN start event publisher configured to publish VPN start events corresponding to a user's group to other subscribing PoPs in response to allowing the user's VPN session;
- a data communications network current VPN session count incrementer associated with a local database and the user's group and responsive to allowing the user's VPN session, the local database being part of a set of distributed databases and including group identifications, corresponding maximum numbers of VPN sessions for each group at the PoP, and corresponding current VPN session counts for each group at the PoP;
- a VPN session count decrementer associated with the local database and a user's group and responsive to terminating the user's VPN session;
- a VPN stop event publisher configured to publish VPN stop events corresponding to a user's group to other subscribing PoPs in response to terminating the user's VPN session; and
- a data communications network current VPN session count decrementer associated with the local database and the user's group and responsive to terminating the user's VPN session.

12. An apparatus for limiting the number of VPN sessions raised by users belonging to a particular group in a data communications network to a predetermined number, the apparatus comprising:
- means for maintaining a central database including group identifications, corresponding network-wide maximum numbers of VPN sessions for each group, and corresponding current network wide VPN session counts for each group;
- means for maintaining a local database associated with a particular PoP of the data communications network, the database being part of a set of distributed databases and including group identifications, corresponding maximum numbers of VPN sessions for each group at the PoP, and corresponding current VPN session counts for each group at the PoP;
- means for responding to a user's attempt to initiate a VPN session on the data communications network as a member of a particular group by checking the central database to determine if the user's VPN session would exceed by a first predetermined number the corresponding network-wide maximum number of VPN sessions associated with the particular group;
- means for rejecting the user's attempt to initiate a VPN session if the user's log in would exceed by the first predetermined number the corresponding network-wide maximum number of VPN sessions associated with the particular group;
- means for responding to a user's attempt to initiate a VPN session on the data communications network as a member of a particular group by checking the local database to determine if the user's VPN session would exceed by a second predetermined number the corresponding maximum number of VPN sessions associated with the particular group at the PoP; and
- means for rejecting the user's attempt to initiate a VPN session if the user's VPN session would exceed by a second predetermined number the corresponding maximum number of VPN sessions associated with the particular group.

13. The apparatus according to claim 12, wherein the first predetermined number is zero.

14. The apparatus according to claim 12, wherein the second predetermined number is zero.

15. The apparatus according to claim 14, wherein the first predetermined number is zero.

16. The apparatus according to claim 12, further comprising:
- means for allowing the user's attempt to initiate a VPN session if it would not exceed any maximum number of VPN sessions associated with the user's group;
- means for incrementing a VPN session count associated with the user's group at the local database in response to allowing the user's VPN session; and
- means for incrementing a VPN session count associated with the user's group at the central database in response to allowing the user's VPN session.

17. The apparatus according to claim 12, further comprising:
- means for allowing the user's attempt to initiate a VPN session if it would not exceed any maximum number of VPN sessions associated with the user's group;
- means for incrementing a VPN session count associated with the user's group at the local database in response to allowing the user's VPN session; and
- means for incrementing a VPN session count associated with the user's group at the central database in response to allowing the user's VPN session.

18. An apparatus for limiting the number of VPN sessions raised by users belonging to a particular group in a data communications network to a predetermined number, the apparatus comprising:
- means for maintaining a local database associated with a particular PoP of the data communications network, the database being part of a set of distributed databases and including group identifications, corresponding maximum numbers of VPN sessions for each group at the PoP, corresponding current VPN session counts for each group at the PoP, corresponding maximum numbers of VPN sessions for each group on the data communications network, and corresponding current network-wide VPN session counts for each group on the data communications network; and means for responding to a user's attempt to initiate a VPN session on the data communications network as a member of a particular group by checking the local database to determine if the user's VPN session would exceed by a first predetermined number the corresponding maximum number of VPN sessions associated with the particular group at the PoP and checking the local database to determine if the user's VPN session would exceed by a second predetermined number the corresponding maximum number of VPN sessions associated with the particular group on the data communications network.

19. The apparatus according to claim 18, further comprising:

means for rejecting the user's attempt to initiate a VPN session if the user's VPN session would exceed by a first predetermined number the corresponding maximum number of VPN sessions associated with the particular group at the PoP or would exceed by a second predetermined number the corresponding maximum number of VPN sessions associated with the particular group on the data communications network.

20. The apparatus according to claim 19, further comprising:

means for allowing the user's VPN session if it is not rejected;

means for incrementing a VPN session count associated the user's group at the local database in response to allowing the user's VPN session;

means for first publishing a VPN start event corresponding to the user's group to other subscribing PoPs in response to allowing the user's VPN session; and means for incrementing a data communications network current VPN session count at each subscribing PoP in response to the first publishing.

21. The apparatus according to claim 20, further comprising:

means for decrementing a VPN session count associated with the user's group at the local database in response to a user's VPN session termination;

means for second publishing a VPN stop event corresponding to the user's group to other subscribing PoPs in response to a user's VPN session; and means for decrementing a data communications network current VPN session count at each subscribing PoP in response to the second publishing.

22. An apparatus for limiting the number of VPN sessions raised by users belonging to a particular group in a data communications network to a predetermined number, the apparatus comprising:

means for maintaining a local database associated with a particular PoP of the data communications network, the database being part of a set of distributed databases and including group identifications, corresponding maximum numbers of VPN sessions for each group at the PoP, corresponding current VPN session counts for each group at the PoP, corresponding maximum numbers of VPN sessions for each group on the data communications network, and corresponding current network-wide VPN session counts for each group on the data communications network;

means for responding to a user's attempt to initiate a VPN session on the data communications network as a member of a particular group by checking the local database to determine if the user's VPN session would exceed by a first predetermined number the corresponding maximum number of VPN sessions associated with the particular group at the PoP and checking the local database to determine if the user's VPN session would exceed by a second predetermined number the corresponding maximum number of VPN sessions associated with the particular group on the data communications network;

means for rejecting the user's attempt to initiate a VPN session if the user's VPN session would exceed by a first predetermined number the corresponding maximum number of VPN sessions associated with the particular group at the PoP or would exceed by a second predetermined number the corresponding maximum number of VPN sessions associated with the particular group on the data communications network;

means for allowing the user's VPN session if it is not rejected;

means for incrementing a VPN session count associated with the user's group at the local database in response to allowing the user's VPN session;

publishing a VPN start event corresponding to the user's group to other subscribing PoPs in response to allowing the user's VPN session; and means for incrementing a data communications network current VPN session count associated with the user's group at the local database in response to allowing the user's VPN session.

23. The apparatus according to claim 22, further comprising:

means for receiving a VPN start event publication corresponding to the user's group from one of the other subscribing PoPs in response to the allowance of a VPN session by one of the subscribing PoPs; and means for incrementing the data communications network current VPN session count associated with the user's group at the local database in response to the receiving.

24. The apparatus according to claim 22, further comprising:

means for decrementing the VPN session count associated with the user's group at the local database in response to terminating the user's VPN session; and means for publishing a VPN stop event corresponding to the user's group to other subscribing PoPs in response to terminating the user's VPN session.

25. The apparatus according to claim 22, further comprising:

means for receiving a VPN stop event publication corresponding to the user's group from one of the other subscribing PoPs in response to the termination of a VPN session at one of the subscribing PoPs; and means for decrementing the data communications network current VPN session count associated with the user's group at the local database in response to the receiving.

26. An apparatus for limiting the number of VPN sessions raised by users belonging to a particular group in a data communications network to a predetermined number, the apparatus comprising:

means for maintaining a local database associated with a particular PoP of the data communications network, the database being part of a set of distributed databases and including group identifications, corresponding maximum numbers of VPN sessions for each group at the PoP, and corresponding current VPN session counts for each group at the PoP; and means for responding to a user's attempt to initiate a VPN session on the data communications network as a member of a particular group by checking the local database to determine if the user's VPN session would exceed by a predetermined number the corresponding maximum number of VPN sessions associated with the particular group at the PoP.

27. The apparatus according to claim 26, further comprising:
means for rejecting the user's attempt to initiate a VPN session if the user's VPN session would exceed by a predetermined number the corresponding maximum number of VPN sessions associated with the particular group.

28. The apparatus according to claim 27, wherein the predetermined number is zero.

29. The apparatus according to claim 26, further comprising:
means for allowing the user's attempt to initiate a VPN session if it would not exceed any maximum number of VPN sessions associated with the user's group; and
means for incrementing a VPN session count associated with the user's group at the local database in response to allowing the user's VPN session.

30. The apparatus according to claim 27, further comprising:
means for allowing the user's attempt to initiate a VPN session if it would not exceed any maximum number of VPN sessions associated with the user's group; and
means for incrementing a VPN session count associated with the user's group at the local database in response to allowing the user's VPN sessions.

* * * * *